Feb. 20, 1968　　J. S. DEBROTNIC ET AL　　3,369,525
IDENTIFICATION TAG IMPLANTING MACHINE
Filed April 13, 1966　　　　　　　　　　　4 Sheets-Sheet 1
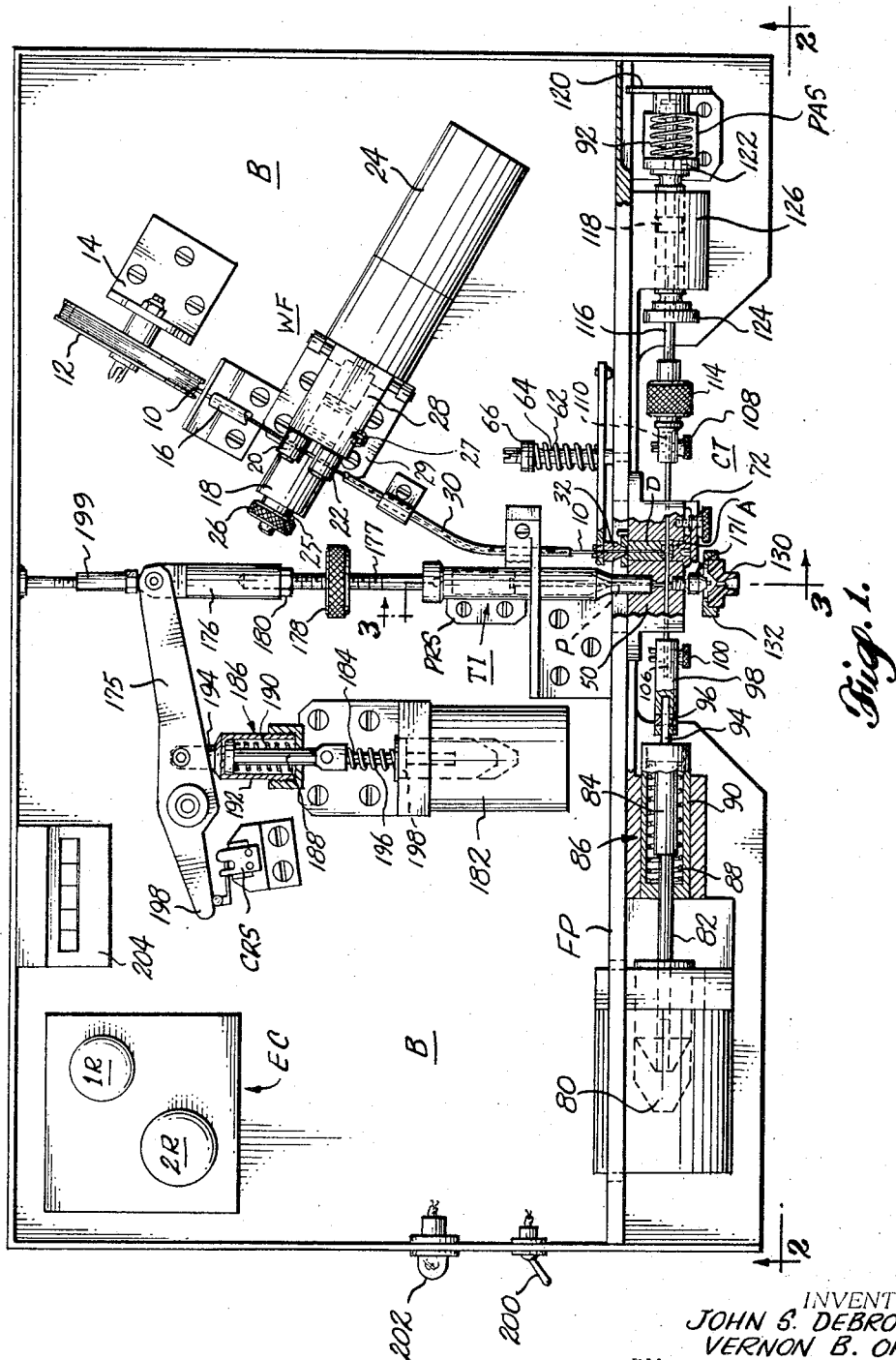
INVENTORS
JOHN S. DEBROTNIC
VERNON B. ORN
WILLIAM E. YOUNG
BY
Graybeal, Cole & Barnard
ATTORNEYS

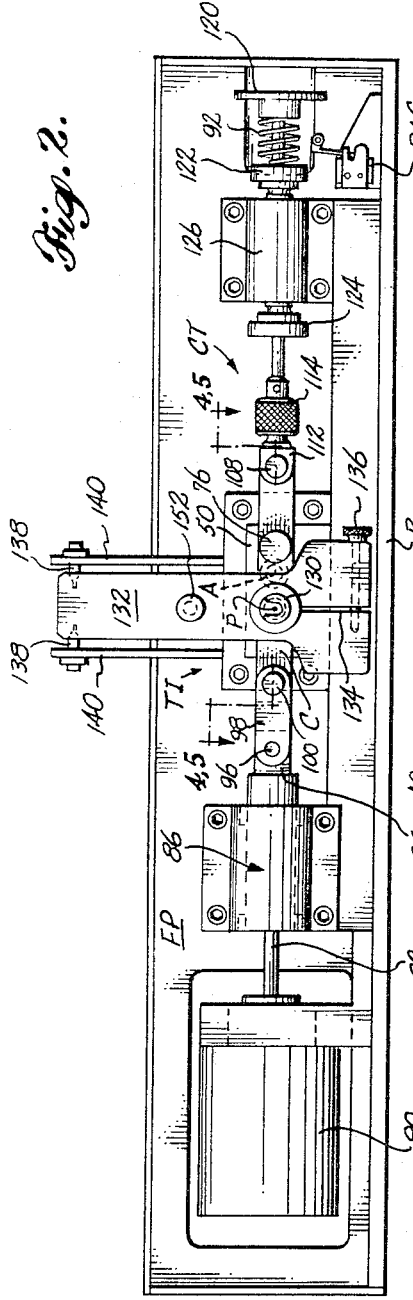
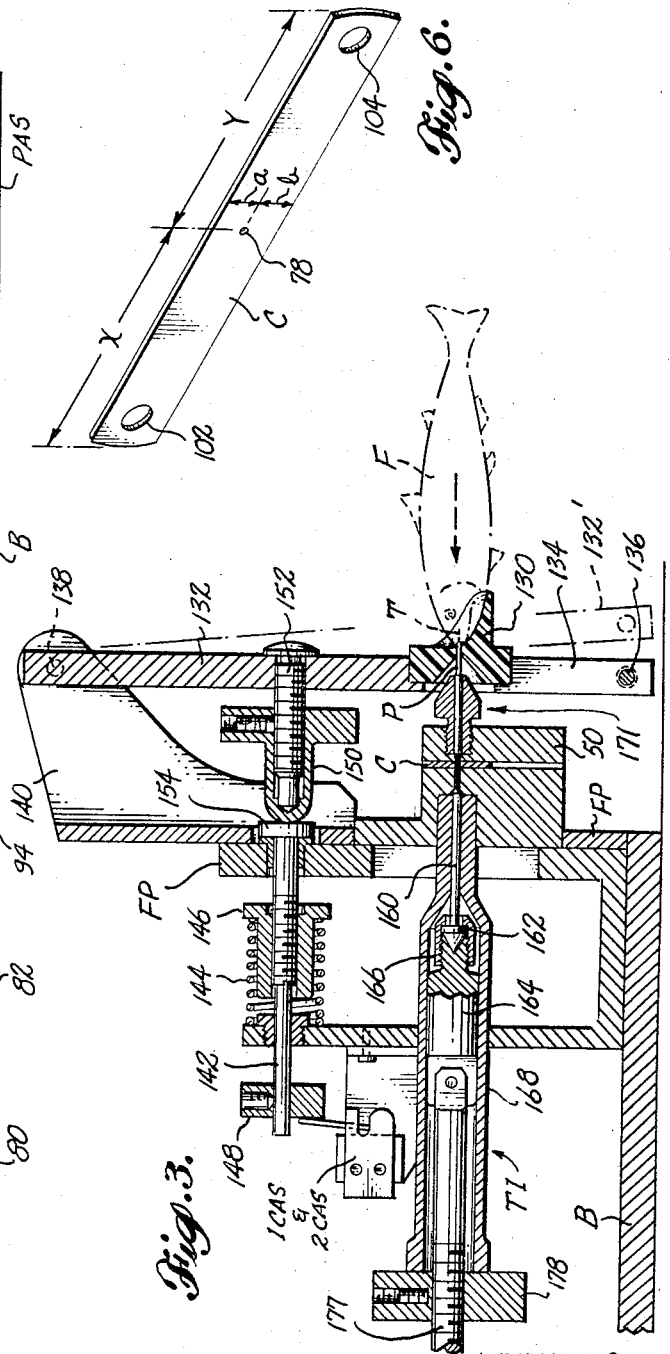

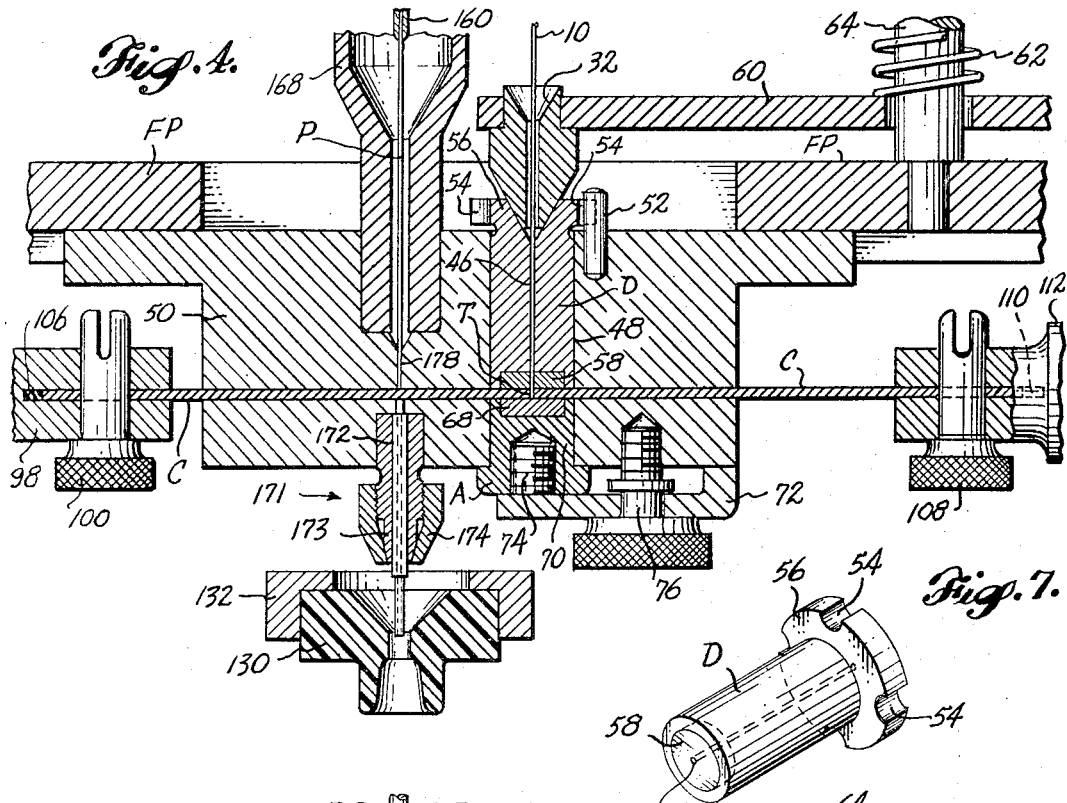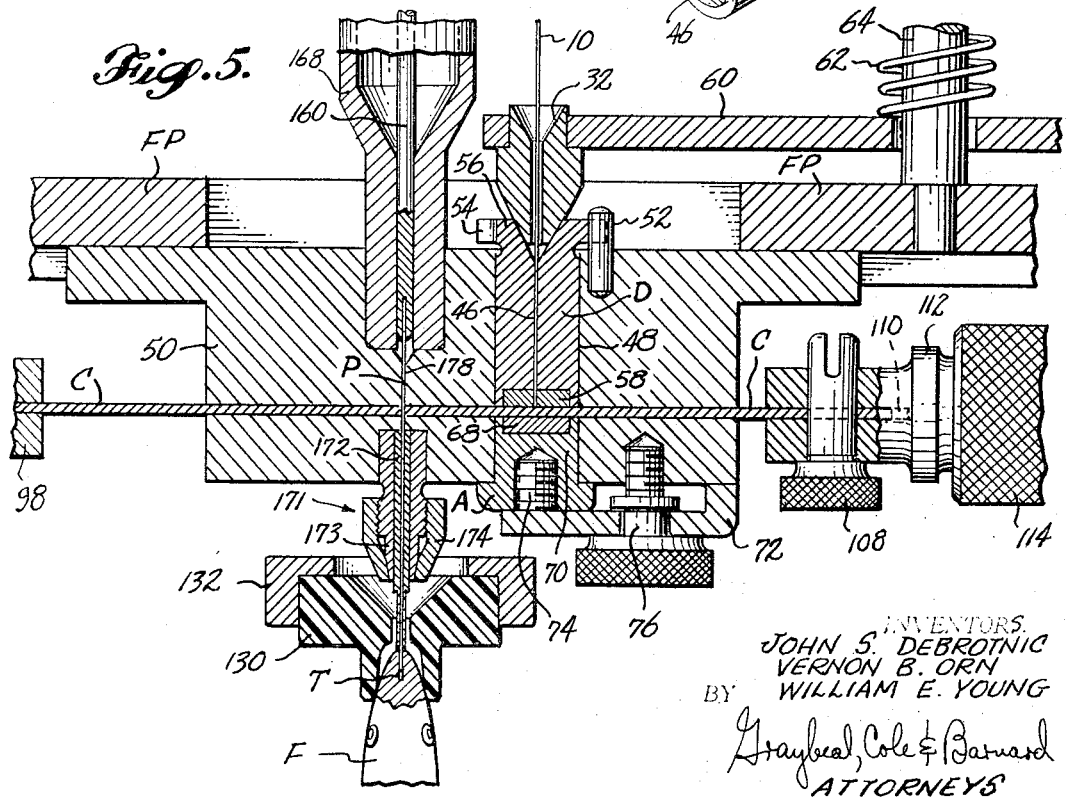

United States Patent Office 3,369,525
Patented Feb. 20, 1968

3,369,525
IDENTIFICATION TAG IMPLANTING
MACHINE
John S. Debrotnic, Seattle, Vernon B. Orn, Renton, and William E. Young, Seattle, Wash., assignors to Technical Research Co., Seattle, Wash., a corporation of Washington
Filed Apr. 13, 1966, Ser. No. 542,389
17 Claims. (Cl. 119—3)

The present invention relates to improvements in mechanisms for cutting and implanting an identification marker or "tag," in the form of a small wire segment, in any desired object receptive to such implantation. While such manner of identification is suitable for tagging any of a wide variety of objects, both animate and inanimate, the herein disclosed mechanism incorporating the present invention is, by way of example, specifically discussed with reference to the use thereof to cut and subdermally implant in a fish or the like an identification tag such as disclosed in Jefferts and Bergman U.S. Patent No. 3,128,744, granted Apr. 14, 1964, in connection with the investigation of the migratory habits of fish and the like.

The manner of implanting a short piece of wire or rod material subdermally in the head of the fish, as disclosed in said Jefferts et al. patent, simply is that of use of a portable, manually operated, hypodermic type injector, which is an inherently slow process when it is considered that it is necessary to tag many thousands of yearling fish in order to maintain comprehensive migratory studies. Semi-automatic machines have been developed for wire tag implantment in fish, but these have proven to be operationally less than fully satisfactory, principally because cut wire tags are quite small (about .010" in diameter and about .040" long, for example), and are difficult to reliably cut and implant in large numbers. Two principal problem areas occurred in prior semi-automatic mechanisms for the purpose; one chronic problem being the tendency for the wire cutting blade to become dull and produce a ragged cut of the tag segment, and the second chronic problem being that the length of wire from which the tags are cut is of insufficient strength and is not sufficiently supported to serve as the injection plunger or "needle" for the cut tag segment. Yet another problem which has arisen with respect to prior wire segment type tag implanting mechanisms is that such tags are in practice coded with one or several strips of resinous material (such as epoxy resin) of various colors, for purposes of subsequent identification of the fish as to source, and any rough handling of the tag segment as it is being cut (as occurs in the case where the shearing blade becomes dull) or rough handling during the implanting of the tag in the fish, can result in removal from the tag of some or all of its coding strips, and a partial or complete loss in identification coding.

To overcome the various practical disadvantages of prior equipments for the purpose, mechanisms according to the present invention, and particularly the embodiments thereof herein disclosed, incorporate the following features:

(a) Continuous wire feed from a coil or the like to a fixed die and a reciprocated cutter blade, with the cut wire segment being transported laterally of the axis of the feed wire of the cutter blade to a point of alignment with an injector plunger separate from the feed wire;
(b) Force limiting means in the tag cutting and transport assembly which minimizes the mechanical shock on the tag and wear on the assembly parts, as would otherwise result while the tag is being cut and being relocated to a position of alignment with the injection plunger;
(c) A cutter bar and cutter die construction which is dimensioned to permit sequential use thereof in a plurality of positions, to greatly increase the useful life thereof;
(d) A plunger assembly for cut tag injection which moves during an injection stroke along a path substantially parallel but laterally offset from the path of feed of the uncut wire stock from which the tags are formed, such injection assembly including an injection plunger which is adequately strong and adequately supported to reliably implant the cut tag in the fish, yet is no larger in diameter than the cut tag, the injection plunger being supported along most of its length and throughout most of the injection stroke, being in part supported by the cutter bar itself, during such stroke;
(e) A plunger assembly for cut tag implantment which includes force limiter means to safeguard against damage to or breakage of the tag implanting plunger thereof; and
(f) Control components which sequence the operation of the tag cutting and tag implanting mechanisms through a complete tag implanting cycle automatically, upon initial actuation by an operator to start the sequence.

These and other features and characteristics of the equipment according to the invention, as well as such other features and advantages thereof as are inherent therein, will be apparent from the following specific description of a typical and therefor non-limitive embodiment of the invention, taken together with the accompanying drawings, wherein the various elements are shown essentially to scale, wherein like letters and numerals refer to like parts, and wherein:

FIG. 1 is a top plan view, with cover removed, of a fish tag cutting and implanting mechanism according to the invention;

FIG. 2 is a front elevational view of the mechanism shown in FIG. 1, taken substantially along line 2—2 thereof;

FIG. 3 is a fragmentary cross-sectional view, on an enlarged scale, of the mechanism shown in FIGS. 1 and 2, taken substantially along line 3—3 of FIG. 1;

FIG. 4 is a cross-sectional view on an enlarged scale, taken substantially along line 4—4 of FIG. 2, showing the cutter bar and associated elements in their positional relation before the cutting and transport stroke of the cutter bar;

FIG. 5 is an enlarged cross-sectional view like that of FIG. 4, showing the positional relation of the cutter bar and associated elements after the cutting and transport stroke of the cutter bar and at the moment of cut tag injection;

FIG. 6 is an enlarged, isometric, detail view of the cutter bar element;

FIG. 7 is an enlarged, isometric detail view of the cutter die element; and

Figure 8:
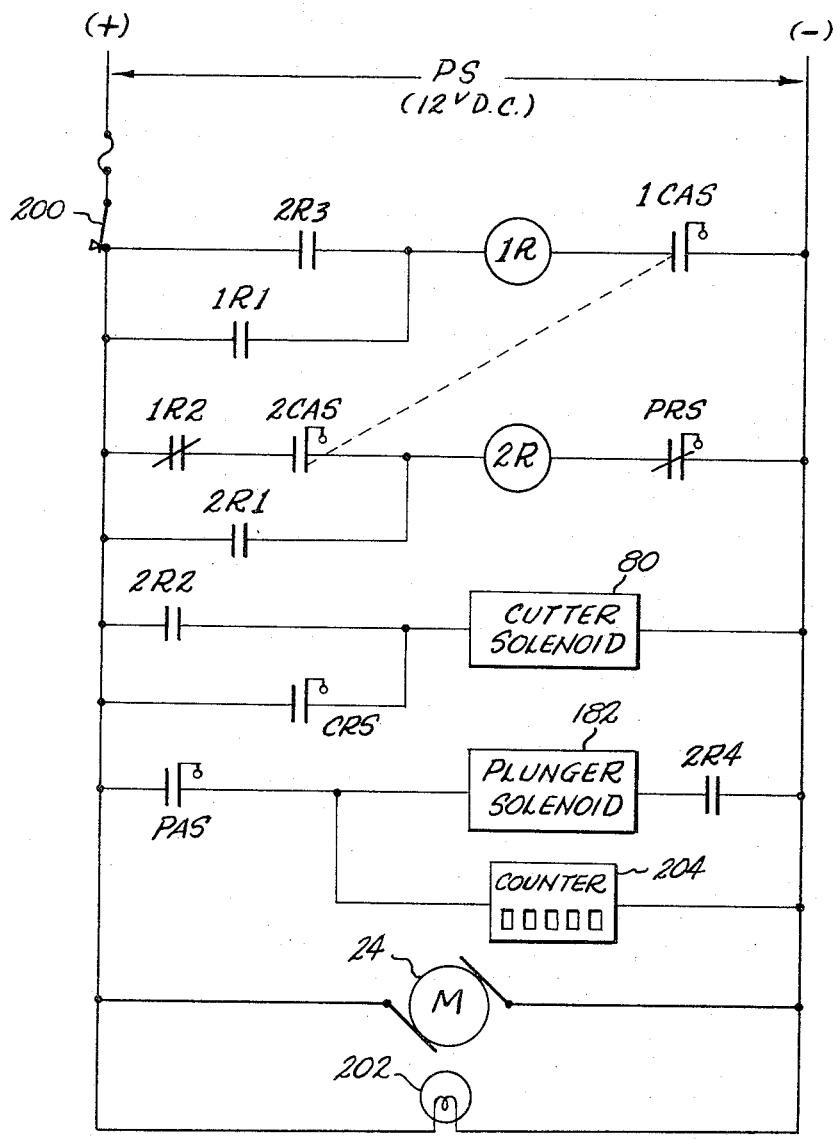
FIG. 8 is a schematic and diagrammatic view of the sequence control components and associated electrical circuit of the equipment.

In general, the tagging mechanism herein shown and discussed comprises a wire feeding assembly WF, a wire segment cutter and transport assembly CT, a tag injector assembly TI, and an electrical control assembly EC all arranged on a base B with a front panel FP. The components of these assemblies are discussed in detail below, in the order named.

*Wire feeding assembly WF*

The coded wire 10, or what may simply be termed the feed wire, from which the injected tag segments are formed, is typically magnetizable wire stock, e.g., stainless steel wire, having a diameter of .010" for example, which suitably has an identifiable characteristic of some sort, such as by having bonded thereto one or more strips of epoxy or like resin of various colors. Each color or combination of colors available from the coding strips of course can serve as an identification as to the time and place of release of a tagged fish. The wire stock 10, and the tag segments formed therefrom, should be ferromagnetic in character to facilitate subsequent detection in the manner disclosed in the above-mentioned Jefferts et al. Patent No. 3,128,744. If desired, the coded wire 10, in addition to the colored coding strips placed thereon, can incorporate a clear continuous resin coating surrounding the wire and coding strips, for protection of the coding strips and the bond thereof to the wire.

Such coded wire 10, as shown in FIG. 1, is coiled onto and fed from a spool or drum 12 which is mounted to be freely rotatable on a support bracket 14. The wire 10, as it leaves the drum 12, feeds into a fixed wire guide 16, then into the bight between a driven rubber roller 18 and idler rollers 20, 22, the rubber roller 18 being continuously driven by motor 24. Rubber roller 18 is axially movable to compensate for wear, by means of washer 25 and nut 26, and the idler rollers 20, 22 are held in friction contact with the roller 18 and wire 10 by means of tension spring 27 acting on hinged plate 28, which is in turn secured to base B by bracket 29.

The feed path of the wire 10 from the feed rollers 18, 20, 22 is to a fixed wire guide 30, from which the wire 10 feeds to the infeed guide 32 of the tag cutter and transport assembly CT.

*Tag cutting and transport assembly CT*

The elements active in cutting a short wire segment from the coded infeed wire 10 are a reciprocated cutter bar C (best shown in FIG. 6), a cutter head die D (best shown in FIG. 7), and an anvil member A. Die D comprises a wire positioning axial bore 46 and is positionable in any one of four angular positions within cylindrical recess 48 of block 50 on the front panel FP by means of an index pin 52 engaged by a selected notch 54 on flange 56 of the die D, for reasons subsequently discussed. The exit face of the die D is provided with a hardened material insert 58, such as tungsten carbide, to minimize wear of the exit portion of the wire feed bore 46 from the repetitive wire shearing action. Die D is held in any selected angular position in the block 50 by the wire guide 32, which is in turn urged against the die D by a retainer bar 60 and compression spring 62 on retainer pin 64 standing rearwardly of the front panel FP, with the tension of spring 62 being adjustable by means of threaded nut 66 on the pin 64. The spring loading of retainer bar 60 and guide 32, available from the compression spring 62, is designed to permit ready removal and rotation or replacement of the die D by movement of the bar 60 rearwardly against the compression of spring 62 to separate the guide 32 from the die D which, after slight rotation of the bar 60 about the pin 64, permits the die D to be moved rearwardly out of the block recess 48 sufficiently so that a given notch 54 previously engaged by pin 52 is clear of the pin 52 and the die D can be angularly rotated to engage another notch 54 with the pin 52. The die D is then reinserted fully into the recess 48, and there held by repositioning of the guide 32 axially of the die D. The spring loading of retainer bar 60 by compression spring 62 also provides constant loading between the die D and the bar C, for uniform shearing action therebetween, a suitable loading in this respect being about 5 lbs.

To also minimize wear of the anvil member A, the face thereof contacted by the end of the incoming code wire 10 is provided with a hardened material, such as a tungsten carbide insert 68. Said anvil member A, in a manner similar to the die D is also readily insertable and angularly positionable in recess 70 of the block 50, by means of removable retainer bracket 72 carrying a bolt 74 on which the anvil member A is threaded, and carrying bolt 76 which threads into block 50.

Cooperating with the hardened inserts 58 and 68 of the die D and anvil member A is a cutter hole 78 (FIG. 6) in cutter bar C. When the cutter bar C is in initial position (FIG. 4), said cutter hole 78 is in alignment with the guide bore 46 of the die D. As will be apparent, with the cutter bar thus positioned, the incoming code wire 10, under the axial thrust from the drive rollers 18, 20, 22, is maintained with the wire in urged position occupying the die bore 46 and occupying the cutter hole 78 of the cutter bar C, with the lead end of the wire urged firmly against the hardened insert 68 of the anvil member A. Then, upon movement of the cutter bar A to the left (i.e., from the position shown in FIG. 4 to the position shown in FIG. 5), a small segment T is cut from the length of wire 10 and moved into alignment with the plunger rod P of the injector assembly TI, discussed below.

Dimensionally, the cutter bar C is suitably about .040″ thick, and the bore 46 of the die D as well as the cutting hole 78 of the cutter bar C are suitably .015″ in diameter, for example (when employing the .010″ diameter code wire previously mentioned). In like manner as the inserts 58, 68 of the die D and anvil member A, cutter bar C is fabricated from a hardened material (such as tungsten carbide), to prolong the useful life thereof.

As an important aspect of the present invention, the die D and cutter bar C, as shown, are expressly designed to have a useful life some four times longer than would otherwise be the case. This design consideration involves placement of the cutter hole 78 on the bar C exactly at the true center of the bar C, i.e. cutter hold 78 is located with its center at a point so that (as shown in FIG. 6) the dimension $a$ equals the dimension $b$, and dimension $x$ equals dimension $y$. Bore 46 of the cutter die D is correspondingly exactly at the axial center of the die D. Recognizing that the wear portions of the die insert 58 and cutter hole 78 will occur in only about a quadrant of the die and cutter hole for any given position of these parts, such placement of the cutter hole 78 and die bore 46 permits the cutter bar C and die D to be correlatively positioned in any one of four positions, each presenting new portions of the die insert 58 and cutter hole 78 for wear. Thus, it will be seen that the cutter bar C can be reversed end-for-end and/or side-for-side, and the die D can be positioned in any one of the four angular positions permitted by the notches 54, and that in each such position the portions of the die insert 58 and cutter hole 78 which performs the cutting action are different. By corresponding rotation of the anvil member A, the useful life thereof is likewise prolonged. As will also be apparent, with each of the members C, D and A readily removable and replaceable, such members can be provided as a set of relatively simple, easily installed replacement parts.

Next discussed are the elements of the cutter and transport assembly CT which function to reciprocate the cutter bar C. The actuating mechanism for the cutting stroke of cutter bar C is solenoid 80 which, upon energization, moves the core rod 82 thereof to the left, as viewed in FIG. 2. Connected to the rod 82 is the piston 84 of a force limiter, generally indicated at 86, which also comprises a compression spring 88 arranged between a piston 84 and a cylinder 90. The function of the force limiter 86 is to permit the solenoid 80 to move through most but not all of its throw before the cutting action and to limit the maximum force exerted on the cutter bar after a tag T has been cut from the wire 10. In a typical installation, the initial movement of solenoid 80 (through a stroke of about 0.4 inch, for example) compresses spring 88 until piston 84 bottoms on cylinder 90. Further movement of solenoid 80 (through a stroke of about 0.1 inch, for example) applies the full solenoid force (a maximum force of about 35 pounds, for example) on the cutter bar C to move the bar C and cause the wire 10 to be cut (which usually occurs at a loading of about 8 pounds, for example). Further movement of the bar C is then caused by expansion of spring 88 (at a force of about 4–6 pounds, for example). This lesser loading, coupled with the relatively light loading on return spring 92 (about 1.5–2.0 pounds, for example), prevents damage to the bar C and its stop mechanism 118–126, hereinafter discussed.

The cylinder 90 of the force limiter 86 is coupled to the cutter bar C through threaded rod 94, adjustment nut 96, linkage 98, and a coupler pin 100 which frictionally engages linkage 98 and one of the end holes 100 to 104 of the cutter bar C (FIG. 6). A rubber abutment element 106 is preferably positioned between the linkage 98 and the cutter bar end therein to increase the retention friction of the bar and linkage on the pin 100.

Similarly, at the other end of the bar C, a coupler pin 108 engages hole 102 or 104 of the bar C and, with rubber abutment member 110, holds the bar end in linkage member 112 which is removably couplable by nylon nut 114 to rod 116, which in turn had intermediately fixed thereto a stop block 118 and a crosshead 120 at the remote end thereof. Crosshead 120 retains and acts against the return spring 92. The limits of movement of stop block 118 are determined by the position of threaded sleeves 122, 124 in fixed cylindrical body 126, and said sleeve 122 also functions as the stationary reaction surface for the return spring 92. As will be apparent, rotational adjustment of the sleeve 122 varies the start or at rest position of the cutter bar reciprocating mechanism, and is adjusted operationally to align the cutting hole 78 with the bar 46 of the cutter die D. Correspondingly, rotational adjustment of sleeve 124 varies the limit of movement of cutter bar C during energization of solenoid 80, and is operationally adjusted to align the cutter bar hole 78 with the plunger P of the tag injector assembly TI, next discussed.

Tag injector assembly TI

The fish F to be tagged is placed by the operator snout-first into a positioning element 130, of nylon or like construction, which is commonly called a "bonnet" or "head mold." The bonnet 130 is inset in and carried by a pivotally movable hanger or hinge plate 132, and is clamped therein by means of hanger slit 134 and clamp bolt 136.

The hanger 132 depends from and is pivotally movable on a pair of support pins 138 mounted on brackets 140 upstanding from the front panel FP, so as to be freely pivotally movable to and from an at rest position (shown fragmentarily in broken line in FIG. 3 at 132') and an energized position (shown in solid line at FIG. 3). The mechanism for initiating a tagging sequence or cycle is in part mounted on said hanger 132, and includes an actuator rod 142 extending through and spring loaded forwardly by compression spring 144 and retainer 146, which normally hold actuator disk 148 on the rear portion of the rod 142 out of contact with cutter actuating limit switch LS1. To initiate a tag cutting and injecting cycle, as discussed in more detail below in connection with the sequence controlling components and associated electrical circuitry, pressure placement of the fish F against the bonnet 130 moves the hanger 132 from its at rest position 132' to its actuated position as shown in solid line at FIG. 3, and a contactor element 150 which is adjustably threaded on bolt 152 mounted in the hanger 132, contacts the flanged end 154 of the rod 142, and rearward movement of the rod 142 and its actuator disk 148 closes limit switch LS1.

Such movement of the bonnet 130 and its hanger 132 into the solid line position shown at FIG. 3 brings the bonnet 130 into axial alignment with the line of thrust of plunger rod P of the tag injection assembly CI. Said plunger rod or wire P (suitably fabricated from guitar E string, with a diameter of .011" for example), is press fit or cemented into plunger holder rod 160. A suitable cementing composition for this purpose is epoxy resin, which permits removal and replacement of the plunger rod P simply by heating of the tip of holder 160 and removing the plunger rod P, with a new plunger rod P being cemented in the holder.

Rod holder 160 comprises a flanged end 162 which is retained on plunger piston 164 by threaded nut 166, and the piston 164, rod 160 and plunger rod P reciprocate in and are guided and supported by a plunger housing 168 having a rear portion of relatively large diameter in contact with said piston 164, and a forward portion of relatively smaller diameter which guides and supports the holder 160. In addition, the plunger rod P is supported and guided by a bore 170 in block 50, and a forwardly extending guide member or "needle" 17 extending forwardly of the block 50 along the line of thrust of the plunger P and extending to a point in close proximity to the bonnet 130 when the bonnet 130 and its hanger 132 are in actuating position (FIGS. 4 and 5). The "needle" 171, by the construction shown, involving a split guide sleeve 172, fingers 173 and tapered threaded nut 174, also functions as a holder for plunger rod P in removing or inserting the rod P in holder rod P, as well as a variable diameter final guide for the rod P during its injection stroke. As will also be noted, as in FIGS. 3 and 5, the cutter hole 78 of cutter bar C being in axial alignment with the bore 170 in block 50 at the moment of tag injection, also serves as one of the supporting and guiding components along the line of thrust of the cut tag and the plunger rod P.

The piston 164 and the plunger members 160 and P carried by it are reciprocated in plunger housing 168 by pivotal movement of rocker arm 175 (FIG. 1), acting through linkage member 176 and linkage rod 177. To provide an adjustment as to the limit of thrust of the plunger rod P in relation to the bonnet 130, linkage rod 177 is threaded in its upper portion and carries an adjustable stop nut 178 (suitably carrying a conventional set screw (not shown) which abuts the rear end of the plunger housing 168 at the forward limit of the injection stroke (FIG. 3). Further adjustment as to the extent of the injection stroke is also provided by fitted connection, including lock nut 180, between the linkage members 177 and 176.

Pivotal movement of the cross arm 175 to effect an injection stoke of rod P is caused by energization of plunger solenoid 182, with force transfer from the core rod 184 to the cross arm 177 being transferred through a force limiter generally indicated at 186, which comprises a piston 188, compression spring 190 and cylinder 192, the piston 188 being connected to the solenoid core rod 184 and the force limiter cylinder 192 being connected through rod 194 to the cross arm 175. The plunger solenoid 182 also comprises a return spring 196, which acts between a fixed abutment ring 198 in the solenoid body and the end of solenoid core rod 184 to maintain the rod 184 extended and the plunger components connected to piston 164 rearwardly retracted, with cross arm 175 resting against adjustable stop 199, except during energization of the solenoid 182.

Typical respective loadings for the force limiter spring 190 and return spring 196 are 1.25 to 3.0 lbs. and 1.17 to 2.0 lbs. As will be apparent, and in a manner comparable to the force limiter 86 operating in conjunction with the cutter bar C, the force limiter 186 in the tag injector assembly TI functions to limit the maximum thrust applied to the plunger rod P and the cut tag segment during the injection stoke, and serves to protect and minimize damage of these parts in the event the path of movement of the cut tag and the plunger rod P is impeded or jammed during the injection stroke.

Electrical control components EC and operating sequence

The control components and associated electrical circuitry by which the disclosed mechanism automatically proceeds through a tag cutting and tag injection cycle after initial actuation are discussed below in connection with the showing of such components and electrical circuitry as presented schematically at FIG. 8, and in conjunction with a general discussion of the sequence of operation characteristic of the invention.

The control circuit schematically presented at FIG. 8 is shown with the components thereof in a standby or "at rest" condition and with the circuit energized, i.e. power supply PS is connected through power switch 200 to continuously energized motor 24 and indicator light 202, with motor 24 urging the code wire 10 through the cutter die D and into hole 78 of cutter bar C. In such standby condition, the cutter bar C and its transfer assembly are at the right as shown in FIGS. 1, 2 and 4, under action of return spring 92, with cutter bar solenoid 80 de-energized. In such standby position, the tag injector assembly TI is in its rearward position as shown in FIG. 1, with plunger solenoid 182 de-energized and the plunger components in retracted position under action of return spring 196, and with the "bonnet" 130 and its hanger 132 in the "at rest" position indicated in FIG. 3 at 132'.

The control circuit for the assemblies CT and TI involves two normally open cutter actuating limit switches 1CAS and 2CAS (FIG. 3), a plunger actuating limit switch PAS (FIGS. 1 and 2) of the normally open type, a plunger release limit switch PRS (FIG. 1) of the normally closed type, and a normally closed cutter release limit switch CRS which is held open by contact with the end 198 of crossarm 175 in the standby condition of the equipment.

The circuit shown at FIG. 8 is expressly designed to initiate one, and only one, cycle or sequence of tag cutting and injection for each activation of the circuit by movement of the fish positioning bonnet 130 and its hanger 132. This "once only" operating sequence is a highly desirable feature of the invention, which renders non-critical the time during which the operator can maintain the fish F against the bonnet 130. Otherwise, without "once only" sequence control, the operator must be careful to not keep the fish against the bonnet too long, in which case it would receive more than one tag and the tag might be cut shorter than desired. To accomplish "once only" sequencing, two control relays 1R and 2R are a part of the electrical control assembly EC (FIG. 1) and incorporated in the control circuit shown in FIG. 8. Control relay 1R is of the double pole double throw type, with a normally open contact 1R1 and a normally closed contact 1R2. Control relay 2R is of the four pole double throw type, with normally open contacts 2R1, 2R2, 2R3 and 2R4. The manner in which these relays 1R and 2R perform the non-recycling mode of operation characteristic of the invention will become apparent from the following discussion of the circuit operation.

With a selected fish F placed snout-first in bonnet 130 and the bonnet 130 moved toward the front panel FP to move the hanger 132 rearwardly to move actuator rod 142, the actuator disk 148 carried by rod 142 is moved to close normally open, mechanically ganged cutter actuating limit switches 1CAS and 2CAS. Closure of switch 2CAS causes energization of relay 2R through the normally closed relay contact 1R2 and the normally closed plunger release limit switch PRS. Energization of relay 2R thereupon closes interlock contact 2R1, closes contact 2R2 in the energization circuit for cutter solenoid 80, closes contact 2R3 in the energization circuit for relay 1R, and closes contact 2R4 in the energization circuit for plunger solenoid 182, which latter solenoid is not then energized however because limit switch PAS is then open. Such closure of contact 2R3 causes energization of relay 1R through the closed limit switch 1CAS, and such energization of relay 1R closes interlock contact 1R1 and opens relay contact 1R2. Relay 2R remains energized, however, after energization of relay 1R, in view of its continued energization through its interlock contact 2R1.

The closure of relay contact 2R2 energizes cutter bar solenoid 80, which, acting through force limiter 86 moves the cutter bar C and connected components to the left, shearing a tag segment T from the end of coded wire 10 and moving the tag segment T into alignment with the bore 170 of the injector assembly TI, which alignment is determined by the setting of stop element 124. With the cutter bar C thus moved to its leftmost position, crosshead 120 at the right extremity of the cutter bar transport assembly CT engages and closes the normally open plunger actuating limit switch PAS. Closure of switch PAS energizes the plunger solenoid 182 through then closed relay contact 2R4. Energized solenoid 182, acting through force limiter 186, moves plunger rod P from its rearward position through a forward, injection stroke, the lead end of the rod P during its course of travel in the bore 170 contacting and pushing the cut tag T forwardly of it and implanting the same subdermally in the snout of the fish F.

At the forwardmost extent of its travel during the injection stroke, plunger stop nut 178 encounters and opens normally closed plunger release limit switch PRS. Upon opening, switch PRS de-energizes relay 2R, reopening the contacts thereof. Opening of relay contact 2R4 de-energizes the plunger solenoid 182, and the return spring 196 moves the plunger assembly to its retracted position, whereupon end 198 of crossarm 175 engages and reopens normally closed cutter bar release limit switch CRS, which thereupon de-energizes cutter bar solenoid 80. De-energization of solenoid 80 permits return spring 92 to return the cutter bar C and its transport assembly to its standby position, at which point plunger actuating limit switch PAS is restored to open condition, and hole 78 of the cutter bar C is realigned with the bore 46 of the cutter die D and receives the next end segment to be cut from the coded wire 10.

At the time of de-energization of relay 2R (upon opening of switch PRS), its interlock contact 2R1 is opened and also its contact 2R3 in the relay 1R energization circuit is opened. Relay 1R will remain energized, however, through its interlock contact 1R1, as long as the limit switch 1CAS remain closed. But, with the relay 2R interlock contact 2R1 open, and with the relay contact 1R2 open because of the energized condition of relay 1R, the relay 2R cannot again become energized until relay 1R is again de-energized, to reclose its contact 1R2. In turn, relay 1R cannot be de-energized until the limit switch 1CAS is reopened by restoration of the hanger 132 to its at rest position.

To provide a count of the number of cycles the equipment is operated, a cycle counter 204, conventional per se, is suitably placed in circuit with the plunger actuating limit switch PAS, and is triggered each time the plunger solenoid 182 is energized.

The complete cycle of operation after depression of the bonnet hanger 132, takes less than about 0.5 second, in a typical mechanism according to the present invention. The wire feed into the cutter bar cutter hole 78 after return thereof to initial position, again in a typical installation, takes approximately 1 second. With such rates of reaction and wire feed, the mechanism is disclosed has a capability of recycling about once every 1½ seconds. In actual use, an operator can only tag at the rate of about one cycle every 3 seconds, so the speed capability of the equipment is in effect operator-limited rather than equipment-limited.

Electrical control assembly EC includes relays 1R and 2R, appropriate wiring connections for the limit switches 1CAS, 2CAS, PAS, PRS and CRS, and the associated power supply components, which can be conventional per se. It has been found suitable, for example, to include in the control assembly EC an appropriate power supply to provide that the electrical circuitry operates at 12 volts DC.

While the equipment and mode of operation disclosed and illustrated are expressly designed for cutting and injecting coded wire segments as identification tags in fish, it will be readily understood the equipment and mode of operation disclosed and claimed herein are equally applicable to identification of any susceptible object, wherether an animate creature or inanimate article, by means of a small tag segment implanted subsurface of the object. Thus, simply by way of further example, and by use of an object positioning mold or surface of appropriate configuration, the disclosed mechanism and its mode of operation can be used as well for tagging any other animal, such as a dog, or fowl, or even a human being for covert identification purposes, or any desired inanimate article such as a package, box, suitcase or book, for example, where particular indentification of a given such animal or article is desired at some future time after tag implant, and after a period of unobserved movement of the object.

In use of cut wire or like segments for object identification purposes by subsurface implant, it will be evident that the identifying or distinguishing characteristic or characteristics of the implant can take a wide variety of forms, involving such identifiable factors as the metallurgical and/or chemical and/or radioactive properties of the implant, as well as its size (diameter and/or length), and cross-sectional configuration (e.g. polygonal), for example.

From the foregoing, these and other applications, modifications, and adaptations of the mechanism and various components thereof, will be apparent to those skilled in the art to which the invention is addressed, within the scope of the following claims.

What is claimed is:

1. In a mechanism for cutting a small segment from a length of wire or the like and for implanting the cut wire segment a receptive object for identification purposes; uncut wire feeding mechanism normally urging the end of the feed wire through the bore of a fixed cutter die and the cutting hole of a reciprocably movable cutter bar, and against a cutting anvil; means for moving said cutter bar laterally of the axis of said feed wire to cause said cutter bar and said cutter die to cut a cut segment from the end of the feed wire and laterally displace said cut segment to a location of axial alignment with the plunger of a plunger-injector assembly; and object positioning element along the axis of such plunger, configured to position a portion of the object to receive the cut tag segment upon axial movement of said plunger; means initiating movement of said plunger through an injection stroke responsive to moveemnt of said cutter bar to place the cutter hole thereof in axial alignment with said plunger; means causing retracting of said plunger after movement thereof through its injection stroke; and means responsive to return of such plunger to its initial position for causing return of said cutter bar from its position with the cutter hole aligned with said injection plunger to its position with the cutter hole thereof aligned with the bore of said cutter die.

2. Mechanism according to claim 1, wherein a fixed guide is positioned between and in axial alignment with said plunger and an opening in said object positioning element to support a substantial length of said injection plunger during its injection stroke.

3. Mechanism according to claim 1, wherein said cutter bar and said cutter die are configured to permit reversal of said cutter bar side for side and end for end and permit angular repositioning of said cutter die about its axis to provide from a single cutter bar and a single cutter die a plurality of wire cutting surfaces on the cutter bar and a plurality of wire cutting surfaces on the cutter die to prolong the useful life of the bar and die.

4. Mechanism according to claim 3, wherein at least the portions of said cutter die and said cutter bar which surround the cutting hole of the bar and which make up the adjacent portion of the cutter die are fabricated of tungsten carbide.

5. Mechanism according to claim 1, wherein the means for moving said cutter bar includes adjustable stop means to limit the extent of lateral movement thereof, and force limiter means minimizing mechanical shock on such stop means.

6. Mechanism according to claim 1, wherein said plunger assembly comprises force limiter means by which movement of said plunger through its injection stroke is relieved in the event the injection path for the plunger and cut tag is impeded.

7. Mechanism according to claim 1, wherein the said feed wire is moved into said cutting die by rotating means resiliently pressing against the side of the wire.

8. Mechanism according to claim 1, wherein said length of wire is coded with at least one colored plastic strip and said object is a fish.

9. A mechanism for cutting a small segment from a length of wire or the like and for identification purposes implanting the cut segment slightly below the surface of an object receptive to such implantation, said mechanism comprising:
   (a) a cutter bar having a cutting hole extending laterally through the bar;
   (b) means for reciprocating said bar to and from a wire receiving position to a wire implanting position;
   (c) a cutter die on one side of said cutter bar, having a wire receiving bore in alignment with said cutting hole when the cutter bar is in such wire receiving position;
   (d) an anvil member on the other side of said cutter bar, presenting a stop surface transverse to the axis of the wire receiving bore of the cutter die and thereby limiting the extent of movement of the length of wire into the cutter bar cutting hole;
   (e) means for urging the length of wire into said wire receiving bore of the cutting die and into the cutting hole of the cutter bar when the latter is in said wire receiving position;
   (f) a cut wire segment injection plunger reciprocably movable along an injection axis in alignment with the axis of the cutter bar cutting hole when the cutter bar is in said wire implanting position;
   (g) an object positioning element against which the object in which the wire segment is to be implanted is held, and having an opening coincident with said injection axis and through which said wire segment and said injection plunger can pass; and
   (h) means for reciprocally advancing and retracting said plunger when said cutter bar is in its wire implanting position.

10. Mechanism according to claim 9, wherein such object positioning element is arranged to be axially movable along said injection axis, and said mechanism further comprises means responsive to movement of the object positioning element toward said injection plunger to initiate movement of said cutter bar from its wire receiving position to its wire implanting position, means responsive to arrival of said cutter bar to its wire implanting position to initiate and injection stroke of said injection plunger, means responsive to movement of said injection plunger to wire segment implanting position to initiate retraction of said plunger, and means responsive to arrival of said plunger to a retracted position to initiate return of said cutter bar to its wire receiving position.

11. Mechanism according to claim 10, comprising electrical control means including lockout circuitry for preventing a second cycle of movement of said cutter bar from bar receiving position until the said object positioning element is relatively withdrawn from and again moved toward said plunger.

12. Mechanism according to claim 9, wherein said cut segment is stainless steel wire with at least one color coded plastic coating thereon, and said object positioning element is configured to receive the snout of a small fish.

13. In a mechanism for cutting a tag segment from a coil of wire or the like and for implanting the cut wire segment in a receptive object, wherein such mechanism comprises uncut wire feeding mechanism urging the end of the wire through the bore of a fixed cutter die and through the cutting hole of a laterally movable cutter bar and against a cutting anvil; means for moving said cutter bar laterally of the axis of said feed wire through a cutting stroke to cause said cutter bar and said cutter die to cut a wire segment from the end of the feed wire and laterally displace said cut segment preliminary to injection of the wire segment into said object, the improvement comprising; mounting means for said cutter die enabling selective positioning of said cutter die at one of several angularly related positions with respect to the wire receiving bore thereof, and mounting means for said cutter bar enabling the cutter bar to be reversible end for end and side for side in relation to the direction of its cutting stroke so as to provide several cutting surfaces on the cutter die and on the cutter bar for effecting the cutting action of these elements on a length of wire fed through the bore of the die and thereby prolong the useful life of these elements.

14. Mechanism according to claim 13, wherein said anvil member is angularly positionable with respect to the direction of movement of the cutter bar during its cutting stroke so as to provide various surfaces for wear thereof.

15. Mechanism according to claim 13, wherein at least the portions of said cutter die and said cutter bar which surround the cutting hole of the bar and which make up the adjacent portion of the cutter die are fabricated of tungsten carbide.

16. Mechanism according to claim 15, wherein the wire end contacting surface of said anvil member is fabricated of tungsten carbide.

17. Mechanism of the type wherein a small segment is cut from a length of coded wire and implanted below the surface of an object receptive to such implantation for objection identification purposes, said mechanism comprising:
 (1) means feeding a length of coded wire along a path of feed,
 (2) an injection plunger having a path of movement substantially parallel to and laterally offset from the path of feed of the uncut wire,
 (3) wire cutting and transport mechanism including a cutter bar having a cutting hole movable from a position of alignment with the uncut wire path of feed into a position of alignment with the path of movement of the injection plunger, and
 (4) means actuating the injection plunger upon alignment of the cutter bar cutting hole therewith, to move the plunger axially through the said cutting hole and effect implantation of a cut wire segment into the said receptive body.

References Cited

UNITED STATES PATENTS

| | | | |
|---|---|---|---|
| 2,883,984 | 4/1959 | Candido | 128—217 |
| 3,001,270 | 9/1961 | Friedman | 128—330 |
| 3,313,301 | 4/1967 | Jefferts et al. | 119—3 X |

FOREIGN PATENTS 253,175    7/1964    Australia.

ALDRICH F. MEDBERY, *Primary Examiner.*